United States Patent [19]

Grech

[11] 4,155,626

[45] May 22, 1979

[54] SPECTACLES WITH A WIDE ANGLE OF VISION AND METHOD

[76] Inventor: Leonard Grech, P.O. Box 2774, Capistrano Beach, Calif. 92624

[21] Appl. No.: 769,670

[22] Filed: Feb. 17, 1977

[51] Int. Cl.$^2$ .................. G02B 27/02; G02B 13/00; G02B 3/10; G02C 9/00

[52] U.S. Cl. .................. 350/145; 351/41; 351/47; 350/197; 350/194; 350/225

[58] Field of Search .............. 351/57, 159, 169, 170, 351/41, 47; 350/197, 212, 225, 133, 145, 146, 189, 132, 194

[56] References Cited

U.S. PATENT DOCUMENTS

| | | | |
|---|---|---|---|
| 2,184,018 | 12/1939 | Ort | 351/212 X |
| 2,537,047 | 1/1951 | Gatten | 351/159 |
| 2,550,685 | 5/1951 | Garutso | 350/197 |
| 2,607,918 | 8/1952 | Gruber | 351/47 X |
| 3,202,046 | 8/1965 | Roos | 351/159 X |
| 3,298,771 | 1/1967 | Ratliff | 350/133 |
| 3,463,570 | 8/1969 | Ratliff | 350/132 X |
| 3,588,227 | 6/1971 | Yamamoto et al. | 350/194 |

*Primary Examiner*—Paul A. Sacher
*Assistant Examiner*—Rodney B. Bovernick
*Attorney, Agent, or Firm*—Gordon L. Peterson

[57] ABSTRACT

Wide angle spectacles comprising a spectacle frame and a wide angle lens system attached to the frame. The wide angle lens system includes at least first and second lenses. The lenses are arranged so that light passes in series first through the first lens and then through the second lens in travelling to the eye of the user. The lens system materially increases the peripheral vision of the user.

10 Claims, 4 Drawing Figures

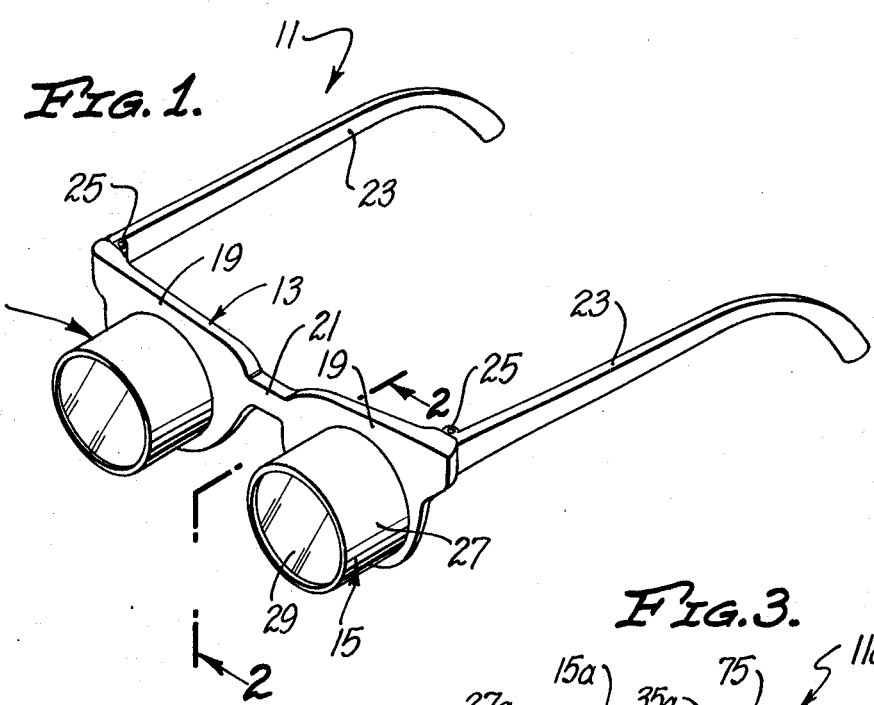
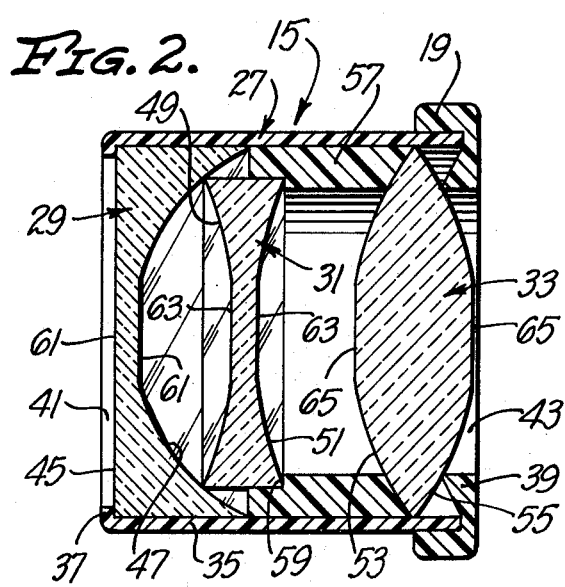
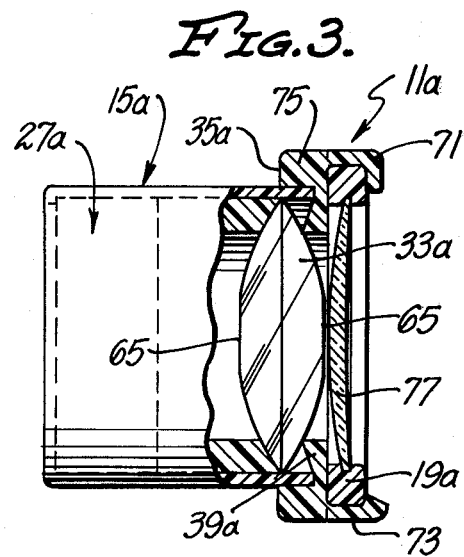
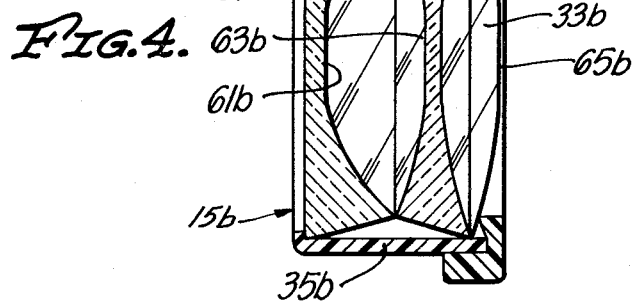

SPECTACLES WITH A WIDE ANGLE OF VISION AND METHOD

BACKGROUND OF THE INVENTION

Some effort has been directed toward providing spectacles having a wide field of vision. For example, U.S. Pat. No. 3,423,151 issued to White shows spectacles having small additional lenses mounted just outboard of the usual eyeglass lenses. These additional lenses are provided to increase the lateral field of vision of the wearer. However, they are not effective in increasing the field of vision above, below and between the eyes of the wearer.

U.S. Pat. No. 2,537,047 issued to Gatten shows spectacles which provide a field of vision which is approximately equal to the field of vision which an individual would have if he did not wear glasses. Thus, these spectacles do not increase the field of vision over that which the wearer has when eyeglasses are not worn.

SUMMARY OF THE INVENTION

The present invention provides spectacles which materially increase the user's field of vision over the field of vision he would have if the spectacles were not used. Furthermore, the widening of the field of vision occurs on all sides of the eye. In other words, the peripheral vision of the user above, below, between and outside of the eyes is improved. Although spectacles which provide an improvement in the field of vision may be used for different purposes, as shown, for example, by the two patents referred to above, the present invention can be used to advantage to improve the peripheral vision of one suffering from tunnel vision.

The advantages noted above can be obtained, at least in part, by mounting an appropriate wide angle lens system on a spectacle frame. The wide angle lens system should be of the type which includes multiple lenses arranged so that the light passes in series through the lenses in travelling to the eye of the user.

The lens system must be of the type which increases the field of vision over the field of vision which the user would have if the lens system were not employed. For example, for an individual with tunnel vision, the lens system would be tailored to provide some appreciable increase in the cross section of the tunnel.

One advantage of a wide angle lens system over the patented devices disclosed above is that the field of vision can be increased on any or all sides of the eyes. In addition, a greater enlargement in the field of vision can be obtained. Although various wide angle lens systems can be used, one preferred construction includes a plano-concave lens, a double concave lens and a double convex lens with the first-mentioned lens being the outermost and the last-mentioned lens being innermost. Of course, the characteristics of each of the lenses can be tailored in a known manner to provide the desired field of vision.

The lens system can advantageously include a housing for at least partially containing the lenses. For example, the housing may include a peripheral wall, and the lenses can be at least partially within the peripheral wall. The ends of the housing are capable of passing light. Preferably, the housing is sealed so that the lenses inside the housing remain clean.

The lens system can be permanently affixed to the spectacle frames. Alternatively, the lens system may be releasably attached to the spectacle frame. This would enable the wide angle lens system to be applied over standard eyeglasses.

One problem with at least some wide angle lens systems is that the image seen by the viewer is distorted. The present invention at least partially overcomes this disadvantage by at least substantially preventing distortion of the image which results from light passing through a central region of the lens system. This can be accomplished, for example, by providing flat, parallel inner and outer surfaces at the central region of any lens in the system which would tend to distort rays of light passing through such central region. For someone having tunnel vision, the area and location of these flat parallel surfaces can be sized and located so as to roughly pass much of the light within the tunnel which can be naturally observed by the person without the aid of any lens system. Thus, a major portion of the field of vision which can be viewed without assistance is undistorted, and only the peripheral regions which would not ordinarily be seen are distorted.

Of course, the central regions of all of the lenses of the system need not be flat in order to avoid distortion because whether or not an image is distorted depends upon the eye correction, if any, required by the individual wearer. For example, utilizing the three lenses referred to above, the central regions of the double convex lens could be configured so as to provide the desired correction, if any, for the eyes of the user. The other lenses of the system could be flattened at their central regions to avoid distortion.

To reduce the size and weight of the lens system, the lenses are preferably as small as reasonably possible. In addition, the lenses should be placed as closely together as possible to reduce the size of the housing for the lenses. Unneeded corners of lenses can be relieved to provide a further reduction in material and weight.

The invention, together with further features and advantages thereof, may best be understood by reference to the following description taken in connection with the accompanying illustrative drawings.

BRIEF DESCRIPTION OF THE DRAWING

FIG. 1 is a perspective view of spectacles constructed in accordance with the teachings of this invention.

FIG. 2 is an enlarged sectional view taken generally along line 2—2 of FIG. 1.

FIG. 3 is an elevational view partially in section and similar to FIG. 2 showing an embodiment of the invention in which the wide angle lens system is removably attached to a standard eyeglass frame.

FIG. 4 is a sectional view similar to FIG. 2 of an axially shortened embodiment of the invention.

DESCRIPTION OF THE PREFERRED EMBODIMENT

FIG. 1 shows wide angle spectacles 11 which generally comprise a spectacle frame 13 and wide angle lens systems 15 and 17. The frame 13 may be constructed of metal or plastic in a conventional manner. In the embodiment illustrated, the frame 13 is constructed of plastic and includes identical lens holders 19 integrally joined by a central nose piece 21. The frame 13 also includes temple bars 23 pivotally joined to the lens holders 19, respectively, by hinges 25.

Each of the wide angle lens systems 15 and 17 enlarges the peripheral vision of the wearer of the spectacles 11. The wide angle lens systems 15 and 17 may be identical, or each of them may be of different construction, so long as they accomplish the basic purpose of enlarging the peripheral vision of the wearer. In addition, each of the wide angle lens systems 15 and 17 may be tailored to the characteristics of the eyes of the wearer so that they can provide the correction, if any, required by that eye. To facilitate explanation, it is assumed for purposes of this description that the lens systems 15 and 17 are identical, and for this reason, only the lens system 15 is described in detail.

Although the lens system 15 may be of different constructions, in the embodiment illustrated, it includes a housing 27 and three lenses 29, 31 and 33 arranged in series so that the light passes in series through the lenses 29, 31 and 33 in passing to the eye of the user. The housing 27 includes a peripheral wall 35 of cylindrical configuration and end walls 37 and 39. The end wall 37 has a large diameter circular opening 41 therein and so the end wall 37 is, in the embodiment illustrated, in the form of a radially short peripheral flange integral with the peripheral wall 35. In the embodiment illustrated, the end wall 39 is in the form of a thickened peripheral flange integral with, and extending radially inward from, the lens holder 19. The end wall 39 has a circular opening 43 centrally located therein.

Although other materials could be used, in the embodiment illustrated, the housing 27 is constructed entirely of plastic material. The housing 27 can be suitably mounted on the lens holder 19 in any suitable manner. As shown in FIG. 2, one end of the peripheral wall 27 is received within the lens holder 19, and it engages the end wall 39. The peripheral wall 27 may be retained in place in the lens holder 19 by an adhesive or other suitable means.

Virtually any arrangement of lenses which is capable of meaningfully enlarging the peripheral vision of the wearer by passing the light in series through such lenses can be used. A number of wide angle lens arrangements of this type are known and can be used in the spectacles 11. The lens arrangement illustrated in FIG. 2 is similar to a lens system which is used in peepholes of the type commonly mounted in outside doors of residences.

The lens 29 is a plano-concave lens having a planar surface 45 which faces axially outwardly and a concave surface 47 which faces axially inwardly. The lens 31 is a double concave lens having concave surfaces 49 and 51 facing axially outwardly and axially inwardly, respectively. The lens 33 is a double convex lens having convex surfaces 53 and 55.

The lenses 29, 31 and 33 are fixedly retained in axial alignment within the housing 27. Specifically, the planar surface 45 of the lens 29 bears against the end wall 37. A tubular spacer 57 of plastic or other suitable material lies axially between the lenses 29 and 33 to hold these lenses against the end walls 37 and 39, respectively. The spacer 57 has a shoulder 59 defined by an annular groove for holding the lens 31 against the concave surface 47 of the lens 29. The peripheries of the lenses 29 and 33 engage the inner surface of the peripheral wall 35. In this manner, all of the lenses are tightly mounted within the housing 27.

The central region of the lens system 15 permits at least some light to pass therethrough to the eye of the user without distorting the image seen by the user which results from such light passing through such central region. In the embodiment shown in FIG. 2, this is accomplished by providing flattened, parallel regions 61, 63 and 65 on the lenses 29, 31 and 33, respectively. The flattened regions 61, 63 and 65 are provided on both the outer and inner surfaces of the associated lenses 29, 31 and 33. The flattened regions 61, 63 and 65 are circular and all of them are parallel, coaxial and of the same radius. Thus, the flattened regions provide unit magnification, i.e., a magnification of one.

The radius of the flattened regions can be varied depending upon the amount of the viewing angle which is to be undistorted. By way of example and not by way of limitation, if the lens 29 were 25 millimeters in diameter, then the flattened region 61 on the concave surface 47 may be up to approximately 4.76 millimeters in diameter. By increasing the radius of the flattened regions, the size of the viewing angle which provides an undistorted image can be enlarged, and conversely, by reducing the radius of the flattened regions, the undistorted region becomes reduced in size.

In order to provide an undistorted central region of the image seen by the user of the spectacles 11, it is not necessary that each of the lenses 29, 31 and 33 have flattened regions. For example, the central regions of the lens 33 may be configured to provide a particular correction required by a particular user and this may require that the central regions of the lens 33 be curved in order to provide that user with an undistorted image at the central regions of the image. In this event, the central regions of the lens 33 may be appropriately curved, and the flattened regions could be employed on the lenses 29 and 31.

As wide angle lenses are known, the various characteristics of the lenses 29, 31 and 33, such as focal length, thickness, radii of the curved surfaces, axial spacing between lenses, etc., can be readily selected by those skilled in the art. For example, the lenses 29, 31 and 33 can be constructed in accordance with the following table where all dimensions are in millimeters:

| Lens | Diameter | Focal Length |
| --- | --- | --- |
| 29 | 25 | 25 |
| 31 | 20 | 20 |
| 33 | 25 | 25 |

It will be apparent to those skilled in the art that the lens 29 will receive light from a wide angle and cause the light rays passing through it to become parallel. These parallel light rays are then diverged by the lens 31 and then made parallel by the lens 33. Of course, parallel light rays passing through the flattened central regions are not refracted and assure that the central region of the image seen by the viewer is not distorted.

In use, the wide angle spectacles 11 can be worn like an ordinary pair of glasses. The wide angle lens systems 15 and 17 increase the field of vision of the user over the field of vision which such user would have without the wide angle lens system. The central regions of the lenses in the lens systems 15 and 17 are configured so that light passing through such central regions does not produce an image which is materially distorted to the user. Of course, the wide angle lenses can be used intermittently in a manner similar to binoculars in which event the lenses need not be releasably mounted on the head of the user like conventional eyeglasses.

FIG. 3 shows wide angle spectacles 11a which are identical to the wide angle spectacles 11 in all respects not specifically shown or described herein. Portions of the wide angle spectacles 11a corresponding to portions of the wide angle spectacles 11 are designated by corresponding reference numerals followed by the letter "a."

The only difference between the wide angle spectacles 11a and the spectacles 11 is that the lens system 15a is releasably mounted on the lens holder 19a. In other words, the lens system 15a can be releasably attached to a conventional pair of eyeglasses.

Although this can be accomplished in different ways, in the embodiment shown in FIG. 3, the housing 27a includes hooks 71 and 73 adapted to embrace the upper and lower edges, respectively, of the lens holder 19a. At least the hook 73 is sufficiently resilient to allow the lens system 15a to be mounted on and removed from the lens holder 19a. The hooks 71 and 73 extend for suitable distances along the upper and lower edges of the lens holder 19a, respectively. In the form shown in FIG. 3, the hooks 71 and 73 are integrally joined to a mounting ring 75 in which the peripheral wall 35a is received. The end wall 39a is integral with the mounting ring 75. The peripheral wall 35a abuts the end wall 39a and is suitably attached, as by an adhesive, to the mounting ring 75. Of course, the lens holder 19a may hold the standard eyeglass lens 77.

The embodiment of FIG. 3 can be used in the same manner as the embodiment of FIGS. 1 and 2, except that with the former, the lens system 15a can be removed as desired from the lens holder 19a. In addition, one or both of the lens holders 19a may have one of the wide angle lens systems removably attached thereto.

FIG. 4 shows wide angle spectacles 11b which are identical to the wide angle spectacles 11, except that the lens system 15b is shortened axially and the lenses 29b and 31b have reduced radial dimensions defining frustoconical peripheral surfaces 81 and 83, respectively. Portions of the embodiment of FIG. 4 corresponding to portions of the embodiment of FIGS. 1 and 2 are designated by corresponding reference numerals followed by the letter "b."

Axial reduction of the lens system 15b is accomplished by placing the lenses 29b and 31b in engagement along the periphery of the lens 31b and by placing the lenses 31b and 33b in engagement along their axially directed inner and outer faces, respectively. In addition, the peripheral wall 35b is reduced in length, and the spacer 57 employed in the embodiment of FIGS. 1 and 2 is eliminated.

The reduction in radial dimensions of the lenses 29b and 31b reduces the weight of the lens system 15b and spaces the peripheral surfaces 81 and 83 from the interior surface of the peripheral wall 35b. The axial and radial size reductions accomplished in the embodiment of FIG. 4 reduce the weight of the lens system. In addition, the appearance of the wide angle spectacles 11b is improved by the axial length reduction in the lens system 15b. Of course, the other lens system employed with the spectacles 11b can be identical to that shown in FIG. 4.

The lens system 15b operates in the same manner as described above for the lens system 15 in providing an increased field of vision. The various characteristics of the lenses for the embodiment of FIG. 4 can be selected by those skilled in the art.

Although an exemplary embodiment of the invention has been shown and described, many changes, modifications and substitutions may be made by one having ordinary skill in the art without necessarily departing from the spirit and scope of this invention.

I claim:

1. Wide angle spectacles comprising:
    a spectacle frame;
    a lens system;
    means for attaching the lens system to the spectacle frame;
    said lens system including at least first and second lenses and means for mounting said lenses so that light passes in series first through said first lens and then through said second lens in traveling to the eye of the user;
    a peripheral region of said lens system being a wide angle lens system for materially increasing peripheral vision of the user over the field of vision which the user would have without the wide angle lens system;
    said lens system including a central region through which at least some light can pass to the eye of the user; and
    said central region passing light to the eye of the user without increasing the peripheral vision of the user.

2. Wide angle spectacles as defined in claim 1 wherein at least one of said lenses has an inner surface and an outer surface at a central region of said one lens, said inner surface and said outer surface at said central region of said one lens being substantially flat and parallel.

3. Wide angle spectacles as defined in claim 1 wherein said lens system includes a lens housing having a peripheral wall, said housing having ends which are capable of passing light, said first and second lenses being at least partially within said peripheral wall.

4. Wide angle spectacles as defined in claim 1 wherein said attaching means releasably attaches the lens system to the spectacle frame.

5. Wide angle spectacles as defined in claim 1 wherein said spectacle frame includes means for releasably attaching the spectacle frame to the head of the user, said spectacles includes parallel flat surfaces on both sides of central regions of said first lens and said second lens and said lens system includes a lens housing having a peripheral wall, said housing having ends which are capable of passing light, said first lens and said second lens being at least partially within said peripheral wall.

6. Wide angle spectacles as defined in claim 1 wherein said preventing means includes said central region provides unit magnification.

7. Wide angle spectacles as defined in claim 1 wherein at least one of said lenses has opposite surfaces, each of said opposite surfaces has a central region, said central regions of each of said opposite surfaces are flat and parallel and a peripheral region of at least one of said opposite surfaces is arcuate in cross section.

8. Wide angle spectacles as defined in claim 1 wherein at least one of said lenses has opposite surfaces and a central region between said opposite surfaces and a peripheral region of at least one of said opposite surfaces is arcuate in cross section.

9. Wide angle spectacles comprising:
    a spectacle frame;
    a wide angle lens system;
    means for attaching the wide angle lens system to the spectacle frame;
    said wide angle lens system including at least first and second lenses and means for mounting said lenses so that light passes in series first through said first lens and then through said second lens in traveling to the eye of the user, said lens system materially increasing peripheral vision of the user;
    said wide angle lens system including a central region through which at least some light can pass to the eye of the user;

means for substantially preventing the image seen by the user and resulting from such light passing through said central region from being distorted;

said first lens being a plano-concave lens and said second lens being a double concave lens, said wide angle lens system including a double convex lens arranged to receive light from the second lens and to direct the light toward the eye of the user; and at least one of said lenses having opposite surfaces, each of said opposite surfaces having a central region, said central regions of each of said opposite surfaces being flat and parallel and a peripheral region of at least one of said opposite surfaces being arcuate in cross section.

10. A wide angle lens system comprising:

a lens system;

said lens system including at least first and second lenses and means for mounting said lenses so that light passes in series first through said first lens and then through said second lens in traveling to the eye of the user;

a peripheral region of said lens system being a wide angle lens system for materially increasing peripheral vision of the user over the field of vision which the user would have without the wide angle lens system;

said lens system including a central region through which at least some light can pass to the eye of the user; and said central region passing light to the eye of the user without increasing the peripheral vision of the user.

* * * * *